Sept. 10, 1940.  N. TRBOJEVICH  2,214,492
STEERING GEAR
Filed Jan. 16, 1939  3 Sheets-Sheet 2
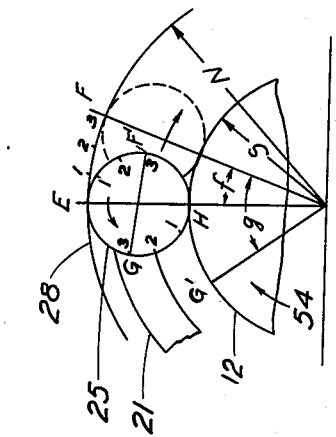
Fig. 5
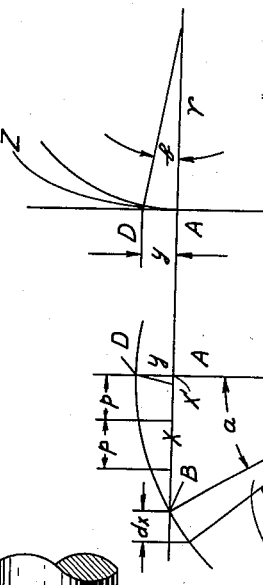
Fig. 4a
Fig. 4
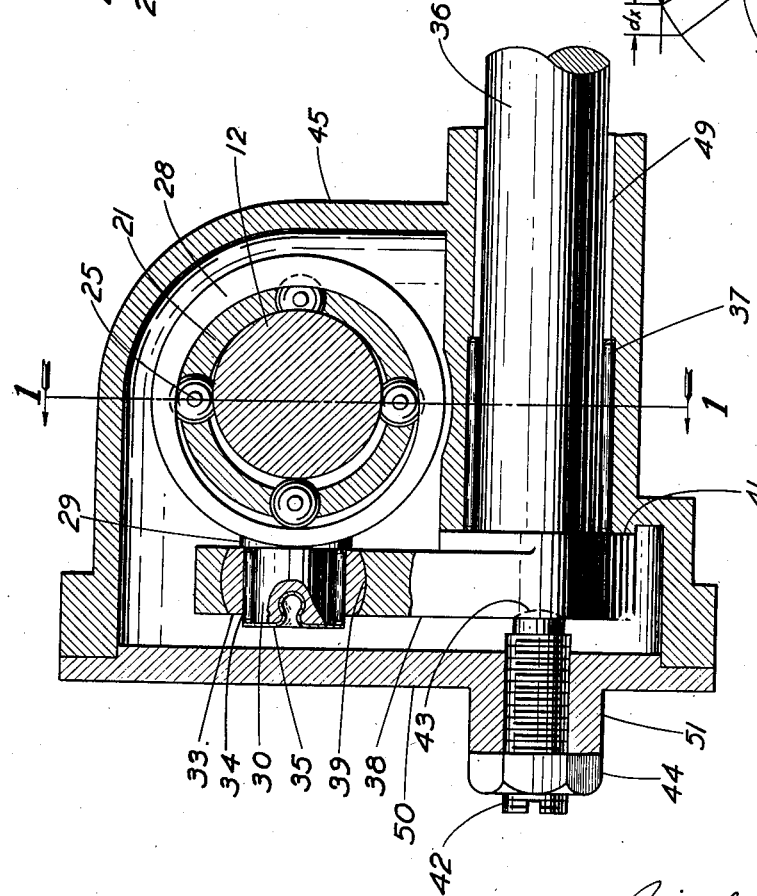
Fig. 2
INVENTOR.
Nikola Trbojevich Sept. 10, 1940.  N. TRBOJEVICH  2,214,492
STEERING GEAR
Filed Jan. 16, 1939   3 Sheets-Sheet 3

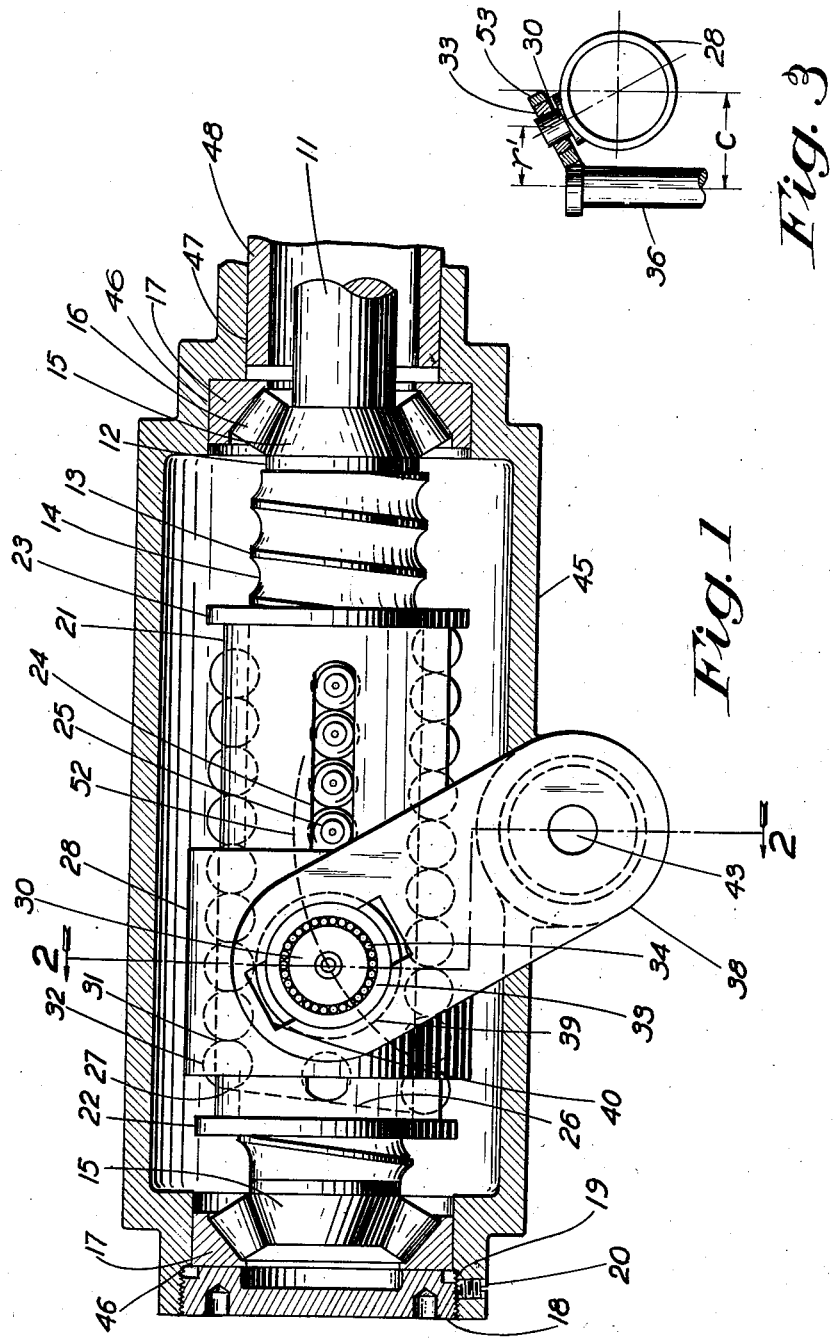

INVENTOR.
Nikola Trbojevich

Patented Sept. 10, 1940

2,214,492

UNITED STATES PATENT OFFICE 2,214,492

STEERING GEAR

Nikola Trbojevich, Detroit, Mich.

Application January 16, 1939, Serial No. 251,239

3 Claims. (Cl. 74—499)

The invention relates to a steering gear of the screw ball-nut and rocker arm type.

Mechanisms of this kind were known prior to this invention, but I discovered a novel type of "ball-nut" construction as well as a novel method of suspension of the rocking "sector" shaft whereby the use of racks, gears or slides is eliminated in this gear.

In particular, the objects of my new ball-nut design are to reduce the number of balls employed and to minimize the friction therein.

The objects of my new sector and nut mechanism are to obtain a maximum self locking action in the mid or straight driving position, to obtain large ratios of transmission without unduly extending the center distance between the controlling and steering shafts, and to reduce the wear by eliminating certain sliding parts.

Further minor objects are to provide a simple and accurate adjustment of the members and to construct a steering gear in which the ratio of transmission may be changed without changing either the screw mechanism, the housing, the bearings or the center distance, i. e., by changing the sector only.

In the drawings:

Figure 1 shows the plan view of the new steering gear with the sector turned to the left 30° and the housing shown in plane section 1—1 Figure 2.

Figure 2 is the section of the gear taken in the broken plane 2—2, Figure 1.

Figure 3 is a diagram showing a modification in the design of the sector whereby the effective torque arm may be shortened.

Figures 4 and 4a are geometrical diagrams used in connection with the equations 1 to 7 inclusive.

Figure 5 is a diagram used in deducing the equations 8 and 9.

Figure 6:
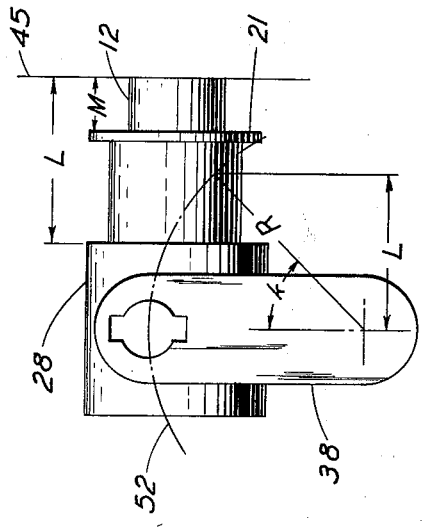

Figure 6 is a diagrammatic top view of the improved gear explanatory of the equations 10 and 11.

Figure 9:
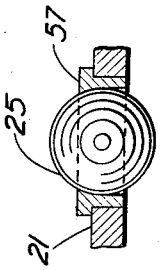
Figure 8:
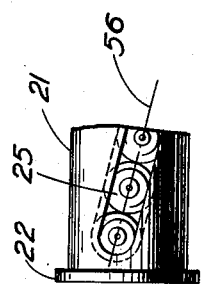
Figure 7:
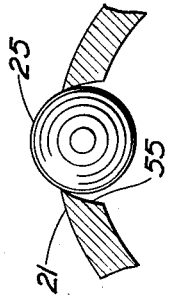

Figures 7, 8 and 9 are fragmentary and diagrammatic views presenting the various methods which can be used in housing the balls in the holder 21.

Figure 11:
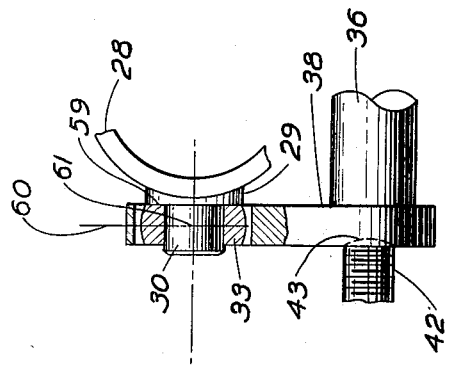
Figure 10:
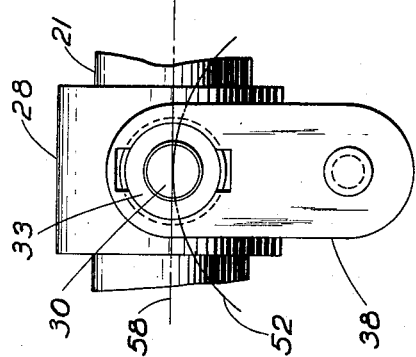

Figures 10 and 11 are two diagrammatic views of a modification of this gear by means of which the friction may be increased and a self locking action obtained in the straight driving position.

As shown in Figures 1 and 2, a manually operable control shaft 11 is integral with the control screw 12 upon whose circumference a heli-
cal thread 13 having a hollow circular cross contour 14 and two conical races 15, one at each end, are formed. The said races 15 contact a plurality of similar taper rollers 16 housed in the corresponding races 17. A suitable running fit in both of these bearings is obtained by a single adjustment of the end disk 18 engaging the screw thread 19 and fixed in the adjusted position by means of a set screw 20.

The ball holder 21 is an elongated cylindrical sleeve of a length predetermined by calculation and provided with an integral flange 22 at its left end and a removable flange 23 at its other end. The holder is further provided with a plurality of longitudinal slots or flutes 24 each containing a string of similar balls 25 contacting in bead-like fashion. The end surfaces 27 of the flutes are accurately formed and staggered for the purpose of arranging all balls in a helix 26, the lead of which is exactly equal to the lead of the screw and nut, the diameter of each ball being equal to the pitch of the screw. The flutes 24 straddle the balls 25 about their midsections in a manner which prevents any considerable end shake and also holds the balls from falling out outwardly. When the holder 24 is correctly made and assembled, it rides entirely on the several strings of balls without touching either the screw or the nut.

The nut 28 is a cylindrical ring having a boss 29 and pivot or journal 30 integral with it. The nut is provided with an internal screw thread 31 of a hollow cross contour 32 of a curvature and pitch exactly corresponding to the balls and the screw. It is essential that these working surfaces be true and highly finished in order that the balls may be either rolled or slidable in the grooves without any prohibitive backlash. A spherical roller 33 is mounted over the needle rollers 34 upon the pivot 30. A cap 35 prevents the rollers from falling out. The pivot 30 is greater in length than the width of the roller 33 by about $\frac{1}{32}$ of an inch because the said roller when rotating also slides longitudinally along its axis through a small distance.

The sector or steering shaft 36 rests on one or more needle roller bearings 37, and is provided with a lever-like extension 38 transversely at its top. The said lever has a spherical bearing 39 formed at its end farthest from the sector shaft, said bearing being of a curvature exactly corresponding to that of the spherical roller 33. Two rectangular slots 40 of a width somewhat greater than the width of the roller are formed diametrically disposed in the said bearing, whereby the roller may be first inserted endwise into the slot and then turned around, when assembling. The end thrust of the sector 36 is taken up and adjusted by means of the thrust collar 41 and the adjusting screw 42, having a spherical seat 43, in the axis of the sector. The said screw is held in its adjusted position by means of the counter nut 44.

The housing 45 is preferably a casting formed from two cylindrical members disposed at right angles to each other. It is provided with two concentric bores 46 to house the roller bearings 17, another also concentric bore 47 in which the steering column 48 is pressed or welded and the sector bore 49 at right angles thereto. The housing is open at its top side in the manner of a cradle over which the top plate 50 is bolted on after the mechanism had been inserted. The said top plate 50 is provided with a boss 51 in which the adjusting screw 42 is contained.

When the screw 12 is rotated, the nut 28 is constrained to travel along the axis of the screw, but at the same time it also rocks to the right or left in such a manner that the axis of its pivot 30 always intersects the circular arc 52 described by the sector arm 38. This results in a variable angular velocity of the sector shaft 36, the exact nature of which will be presently entered into. During this motion the spherical roller 33 rotates upon the needle rollers 34, it slides up and down the same and it also rocks in the spherical socket 39, but does not rotate in the same. In order to minimize the maximum values of the said last two displacements, viz. the sliding of the roller along its axis and its rocking about another axis roughly perpendicular thereto, I dispose the circular path 52 of the sector arm center in such a relation with respect to the axis of the screw that the projection of the said axis upon the plane of the said circular path, see Figure 1, bisects the height of the said arc. Thus, for a total swing of the sector shaft of 45° in either direction, the bisecting line is found at 31° 24′ from the center. In Figure 1 I placed the bisector at 30° from the center which is sufficiently close for all practical purposes.

It is to be noted in this connection that in this system of steering gears there is no theoretical restriction as to the exact length and location of the sector arm 38 relative to the nut 28, in consequence of which the said arm may be made longer or shorter for a given center distance C, Figure 3, or the arm may even be inclined at an angle relative to the nut, as is diagrammatically shown in the said figure. This is important from a commercial standpoint because by the virtue of this property, one may now construct an entire series of steering gears each having a different ratio, but each employing the same screw, nut, bearings and the housing, the only variable being the sector.

As previously stated, the new gear has a variable ratio of transmission and the said variation consists of two parts. The first variation is due to the discrepancy of the rectilinear motion of the nut with respect to the circular motion of the sector, and the second variation is of a differential character, i. e., it is added to or subtracted from the first variation depending upon the hand and the direction of rotation of the screw and is due to the rocking motion of the nut about its axis. Both of these variations are of a distinctly beneficial character from a practical standpoint in that they both gradually diminish and finally disappear in the straight driving position, thus providing a natural resting point and a point of maximum irreversibility in that much used area.

To determine the above mentioned two velocity variations numerically, the following relations may be written down with reference to the diagrams 4 and 4a:

Let $AB=x$ be the path described by the nut and $DB=a$, the arc described by the sector from the initial position, then, $$x = R \sin a \quad (1)$$

Differentiating this equation with respect to $a$ I have:

$$\frac{dx}{da} = R \cos a \quad (2)$$

Let now $p=$ the pitch of the screw and $w=$ the rotation (displacement) of the screw in absolute measure, it stands that $$\frac{w}{2\pi} = \frac{x}{p} \quad (3)$$

or from the Equations 1, 2 and 3

$$\frac{dw}{da} = \frac{2\pi R}{p} \cos a \quad (4)$$

Thus, without considering the rocking of the nut from D to A through an angle $b$, the ratio of the transmission is at its maximum in the position OD corresponding to $a=o$ and from then on it gradually diminishes proportional to the cosine of $a$. The path $x$ of the nut, hence, increases with the sine of $a$, Equation 1, that is, not in a constant ratio with the angle $a$ but somewhat slower. The difference is not great, however. For a swing of 30° in my construction the nut advances a distance $x=.500R$ while if I employed a constant velocity rack and pinion mechanism, that distance would be .5236R, an increase of 4.7 per cent. Hence further, in my construction the screw may be made somewhat shorter than would be the case in a constant velocity job.

To analyze the second velocity variation, the one due to the rocking of the nut from D to A, Figures 4 and 4a I first write:

$$DA = R(1-\cos a) = r \tan b = y \quad (5)$$

To the rotation of the nut through an angle $b$ there corresponds a displacement $x'$ of the said nut along its axis. That value may be written down analogously to the Equation 3:

$$x' = \pm \frac{pb}{2\pi} \quad (6)$$

the plus minus sign denoting the differential (additive or subtractive) character of this increment.

I shall now show that in a typical mechanism of this kind, such as was shown in Figures 1 and 2, the value of this increment $x'$ is only about $\pm 1$ per cent of the value of $x$, the main displacement.

The numerical values in that example are:

$R = 2.165''$
$r = 1.400''$
$p = .375''$
$a = 30°$

Hence $x = 1.0825''$ from 1
$y = .290''$ from 5
$b = 11° 42'$ from 5
$x' = .0122$ from 6 and $$\frac{x'}{x} = .0113 \quad \text{Q. E. D.}$$

It remains to determine the distance $z$, Figure 4a, which is the amount of axial sliding of the spherical roller 39 in its bearing 34.

$$z = r(\sec b - 1) \quad (7)$$

By substituting the numerical values above quoted, I have $z=.0297''$, that is less than $\frac{1}{32}$ inch.

The rocking of the said roller in its spherical seat is equal to the angle $b$.

In dimensioning and designing the ball holder 21 it is first necessary to define its motion. When the screw 12 in Figure 1 is rotated, the nut 28 will translate axially with a velocity depending upon its pitch $p$ while the ball holder will advance in a helical path the exact lead of which can be calculated on the assumption that the balls 25 roll without slipping in their grooves. The motion is evidently of an epicyclic type. As is seen from Figure 5, when the ball 25 rolls upon the stationary nut 28 from E to F through an angle $f$, the screw 12 will also rotate in the direction of the arrow 54 through an angle $g$. There being no slippage the arcs EF, EF', HG and HG' are all equal in length. Hence, $$S(g-f) = Nf \quad (8)$$

or $$f = \frac{S}{S+N} g \quad (9)$$

where $f$ is the rotation of the ball holder 21, $g$ the rotation of the screw 12, S the radius of the screw and N the radius of the nut 28. Hence, for one turn of the screw $(g=1)$ the holder will turn $$\frac{S}{S+N}$$

times, i. e., .38 times in the above numerical example. Further, the ball holder translates in the same direction as the nut but with a linear velocity reduced with respect to that of the nut according to the above proportion.

The lengths of the screw 12 and the ball holder 21, in order to accommodate the maximum swing $k$ of the sector arm 38, can now be determined from Figure 6. The stroke of the nut 28 is equal to L where $$L = R \sin k \quad (10)$$

and $$M = \frac{SL}{S+N} \quad (11)$$

Regarding the ball holder 21 which is an important detail in this mechanism, I shall make the following remarks. As shown in the diagram, Figure 6, upon correctly proportioning the distances L and M, the nut 28 just overtakes the holder 21 when they both reach the wall of the housing 45, providing the balls do not slip in the meanwhile. If they do slip, the holder will lag somewhat in proportion to the said slippage but towards the end of stroke L, the nut will push the ball holder over by sliding together with it. Thus, the mechanism is self-correcting and each time a complete stroke has been traversed by the nut, the holder will start on its trip anew from a correct initial position.

The methods of arranging and securing the balls in the ball holder may follow various patterns as long as a provision is made, first that the balls do not fall out outwardly, second that they are freely rotatable in their slots or sockets and third, that they transmit the axial thrust upon the holder in order to move the same in its helical path as required by the theory. Thus, the balls are usually held bead-fashion in straight or helical slots, but they also may be held each separately in an individual perforation or bushing.

It is to be noted that by disposing the balls in longitudinal rows, the friction between the contacting balls is reduced because they touch each other along their axes of rotation.

Figure 7 shows a contour 55 of a slot in the ball holder 42 of such a form that it can be broached.

Figure 8 shows a helical form of a slot disposed about the helix 56, preferably at right angles to the helixes of the screw and nut.

Figure 9 shows an arrangement in which each ball 25 is held in an individual bushing 57, said bushing being inserted in a corresponding perforation made in the holder 21.

In conclusion, I shall describe an interesting modification of this steering gear which may be used in all such cases when it is desired to increase the friction by introducing a brake in the straight driving position which is released immediately when the sector departs from the mid position either to the right or left. In order to do this, I take advantage of the fact that the spherical roller 33, Figures 1 and 2, slides outwardly from the boss 29 along the axis of the pivot 30. If I now arrange the sector relative to the nut 28 in such a manner that when the said sector is in the mid position, the roller 33 will press against the top surface 29, with a predetermined frictional force which may be obtained by regulating the pressure upon the said boss.

An arrangement of this kind is diagrammatically represented in Figures 10 and 11. In plan view, the sector arm 38 is so disposed relative to the axis 58 of the nut that the circular path 52 of its spherical bore is tangent to the said axis in the mid or straight driving position. At this instant, in elevation, Figure 11, the lower face of the roller 33 presses against the flat face 59 of the boss 29 integral with the nut 28. The pressure of this contact is adjusted by tightening the screw 42 against the seat 43. When the sector arm 38 is swung either to the right or to the left, it will always stay in the plane 60 while the center of the pivot will rotate in the circle 61 thus elevating the roller 33 from its seat 59 and discontinuing the friction. The braking effect can still further be increased by making the bore of the roller 33 and diameter of the pivot 30 slightly tapering.

What I claim as new is:

1. A steering gear comprising a screw rotatable in two bearings, a tubular ball carrier having a plurality of longitudinally arranged perforations, two flanges at its two ends and a length less than that of the screw, a plurality of balls rotatable but not otherwise movable in the said perforations and arranged in a helix, a nut engaging a plurality of the said balls and having a length less than that of the carrier and a transverse rocking shaft operatively connected to the said nut.

2. A steering gear comprising a rotatable screw, a tubular ball carrier provided with a plurality of longitudinally extending enclosed slots, said carrier being of less length than the screw, a plurality of balls arranged in a plurality of longitudinal rows rotatable in the wall of the said carrier in the said slots but not otherwise movable, each ball being equal in diameter to the pitch of the screw and all balls being helically arranged, a nut engaging a plurality of the said balls and having a length less than the said carrier, abutting means at each end of the carrier limiting the relative motion of the nut with respect to the carrier and a transverse rocking shaft operatively connected to the nut.

3. A steering gear comprising a screw and nut mechanism and a transverse rocking shaft operatively connected thereto in which the said screw mechanism comprises a rotatable screw, a perforated ball carrier of less length, a nut of still less length, a plurality of balls rotatable in the plurality of the said perforations, arranged in a helix and abutting means at the two ends of the said carrier, in which the corresponding lengths of the screw, ball carrier and nut are so determined that at the end of a predetermined stroke the nut will overtake the carrier and by sliding together with the same will correct any possible lagging of the carrier during the said stroke due to inaccuracies and other reasons.

NIKOLA TRBOJEVICH.